(12) United States Patent
Hagino

(10) Patent No.: US 7,646,179 B2
(45) Date of Patent: Jan. 12, 2010

(54) ELECTRIC POWER SUPPLY CIRCUIT AND ELECTRONIC DEVICE

(75) Inventor: Koichi Hagino, Hyogo (JP)

(73) Assignee: Ricoh Company, Ltd. (JP)

( * ) Notice: Subject to any disclaimer, the term of this patent is extended or adjusted under 35 U.S.C. 154(b) by 268 days.

(21) Appl. No.: 11/723,515

(22) Filed: Mar. 20, 2007

(65) Prior Publication Data

US 2007/0216386 A1 Sep. 20, 2007

(30) Foreign Application Priority Data

Mar. 20, 2006 (JP) .............................. 2006-076895

(51) Int. Cl.
*G05F 1/00* (2006.01)
(52) U.S. Cl. ....................................... 323/222; 323/271
(58) Field of Classification Search ................. 323/222, 323/242, 271, 274, 284, 288, 292
See application file for complete search history.

(56) References Cited

U.S. PATENT DOCUMENTS 6,541,947 B1 * 4/2003 Dittmer et al. ............... 323/284
7,157,959 B2 * 1/2007 Ball et al. .................... 327/427
7,245,116 B2 * 7/2007 Tateno et al. ................. 323/316

FOREIGN PATENT DOCUMENTS

JP 2555245 8/1997
JP 2004-274200 9/2004

* cited by examiner

*Primary Examiner*—Jessica Han
*Assistant Examiner*—Emily Pham
(74) *Attorney, Agent, or Firm*—Dickstein Shapiro LLP

(57) ABSTRACT

An electric power supply circuit includes a first switching element that turns on or off according to an external signal; an inductor capacitor circuit provided between the power supply and the load that charges or discharges electric power provided by the power supply according to the on or off state of the first switching element; a rectifier diode provided between the first switching element and the ground; a second switching element provided in parallel with the rectifier diode that turns on or off synchronously with the first switching element; and a depletion transistor that detects a direction of a current flowing through the inductor capacitor circuit based on a voltage detected across the second switching element to generate a detection result, and causes the second switching element to turn on or off according to the detection result.

9 Claims, 2 Drawing Sheets

ELECTRIC POWER SUPPLY CIRCUIT AND ELECTRONIC DEVICE

CROSS-REFERENCE TO RELATED APPLICATIONS

This patent application is based on and claims priority under 35 U.S.C. §119 to Japanese patent application No. 2006-076895 filed on Mar. 20, 2006, in the Japanese Patent Office, the entire contents of which are hereby incorporated by reference.

FIELD OF THE INVENTION

Example embodiments of the present invention relate generally to an electric power supply circuit and an electronic device incorporating the electric power supply circuit.

DESCRIPTION OF THE RELATED ART

A portable electronic device, such as a notebook computer, personal digital assistance (PDA) device, or portable phone, is usually provided with an electric power supply circuit having a DC to DC circuit. For example, the electric power supply circuit described in the Japanese Utility Model Application Publication No. H4-101286, which is illustrated in FIG. 1, may be incorporated in the electronic device.

The electric power supply circuit of FIG. 1 includes a first switching element 11 that turns on or off according to an external signal, an inductor 12 for supplying electric power to a load according to the on or off state of the first switching element, rectifier diodes 16 and 17, and a smoothing capacitor C. The circuit of FIG. 1 further includes a second switching element 14 provided in parallel with the rectifier diode 17, and a comparator 15 connected to the second switching element 14. In operation, the comparator 15 detects the direction of a current flowing into the inductor 12 based on the voltage detected across the second switching element 14 to generate a detection result, and turns on or off the second switching element 14 according to the detection result. In this manner, the efficiency of the circuit shown in FIG. 1 may increase even when the light load is connected to the circuit of FIG. 1.

However, in order to further increase the efficiency, the comparator 15 needs to be highly responsive such that the second switching element 14 is turned on or off instantaneously according to the detection result. However, the highly responsive comparator usually consumes more energy such that the overall electric power consumption may increase.

SUMMARY

An example embodiment of the present invention includes an electric power supply circuit in which electric power consumption is suppressed without lowering the circuit efficiency, and an electronic device incorporating the electric power supply circuit.

In one example, the electric power supply circuit includes a first switching element that turns on or off according to an external signal; an inductor capacitor circuit provided between the power supply and the load that charges or discharges electric power provided by the power supply according to the on or off state of the first switching element; a rectifier diode provided between the first switching element and the ground; a second switching element provided in parallel with the rectifier diode that turns on or off synchronously with the first switching element; and a depletion transistor that detects a direction of a current flowing through the inductor capacitor circuit based on a voltage detected across the second switching element to generate a detection result, and causes the second switching element to turn on or off according to the detection result.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
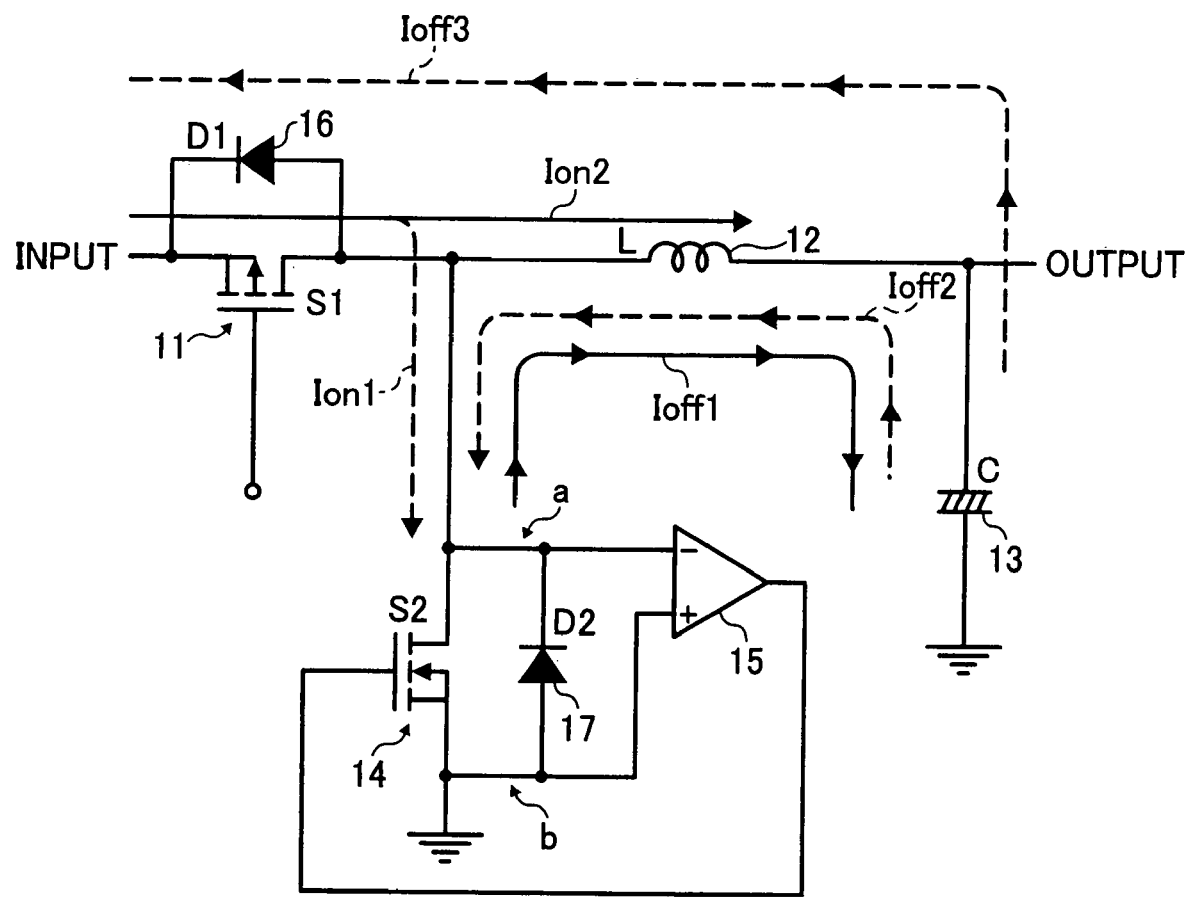
FIG. 1 is a circuit diagram illustrating a background electric power supply circuit.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. For example, the singular forms "a", "an" and "the" are intended to include the plural forms as well, unless the context clearly indicates otherwise.

Figure 2:
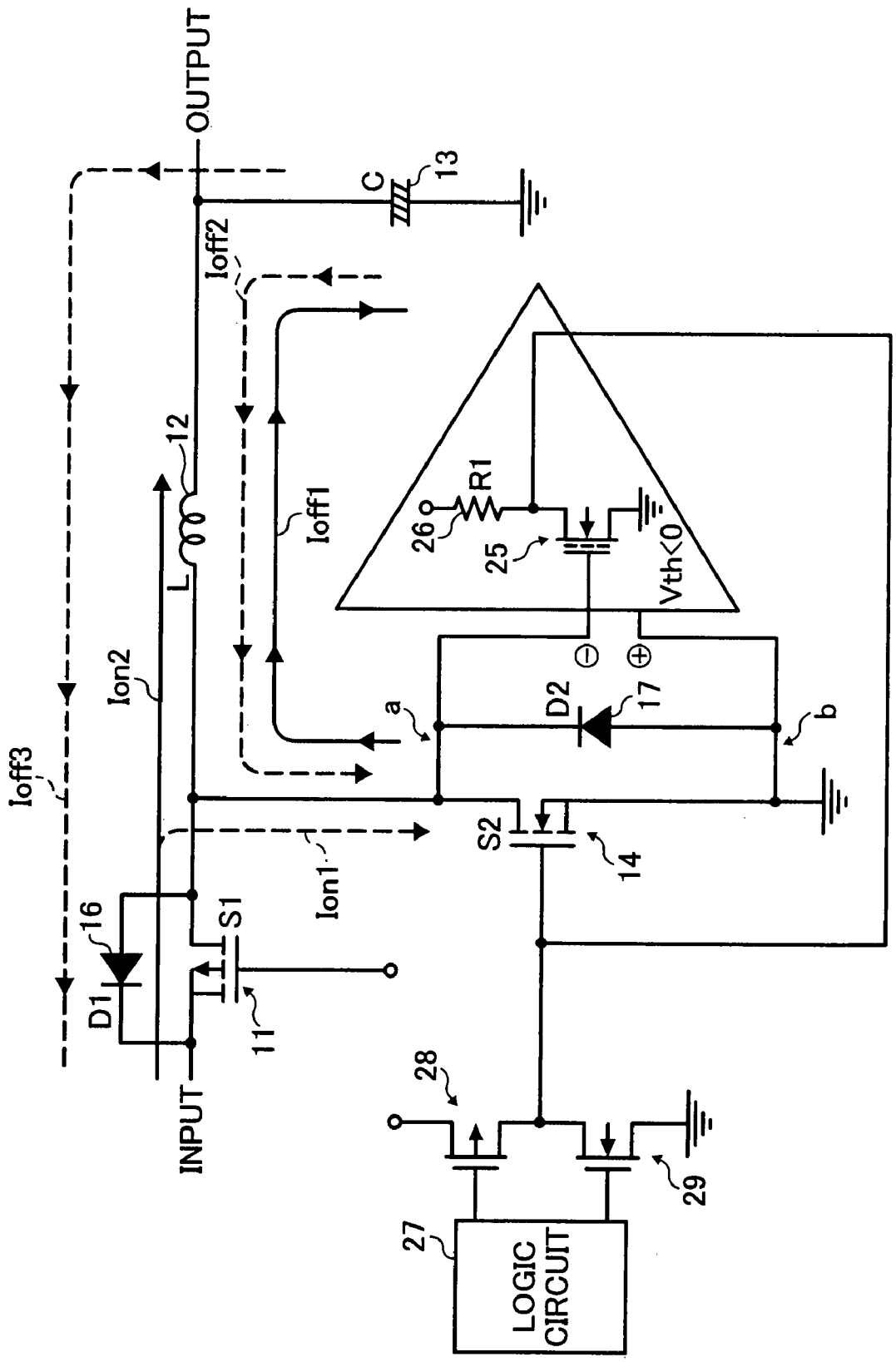
FIG. 2 is a circuit diagram illustrating an electric power supply circuit according to an example embodiment of the present invention.

Referring now to the drawings, wherein like reference numerals designate identical or corresponding parts throughout the several views, FIG. 2 illustrates an electric power supply circuit according to an example embodiment of the present invention. The circuit of FIG. 2 includes a first switching element 11, an inductor 12, a second switching element 14, rectifier diodes 16 and 17, a smoothing capacitor 13, a depletion transistor 25, a resistor 26, a logic circuit 27, a first transistor 28, and a second transistor 29. The circuit of FIG. 2 is connected to a power supply at an input terminal ("INPUT"), and to a load at an output terminal ("OUTPUT").

The first switching element 11 may be implemented by a bipolar or a metal oxide semiconductor (MOS) transistor, which turns on or off according to an external signal. The inductor 12 may be implemented by a coil capable of storing electric power, or a choke that regulates the voltage level. The second switching element 14 operates in synchronization with the first switching element 11.

The depletion transistor 25 may be implemented by an N-channel (Nch) depletion transistor 25 having a threshold value Vth less than 0. The depletion transistor 25 detects the voltage across the second switching element 14, and determines the direction of the current flowing into the inductor 12 to generate a detection result. Based on the detection result, the second switch element 14 is turned on or off. For example, when the voltage detected at the point a is negative and the voltage detected at the point b is positive, the depletion transistor 25 outputs the high level signal. Upon receiving the high level signal, the second switching element 14 is turned on. When the voltage detected at the point a is positive and the voltage detected at the point b is negative, the depletion transistor 25 outputs the low level signal. Upon receiving the low level signal, the second switching element 14 is turned off. The resistor 26 is provided in series with the depletion transistor 25 to form an inverter circuit together with the depletion transistor 25.

The logic circuit 27 may generate a control signal for turning on or off the second switching element 14. In this example, the logic circuit 27 controls timing for turning on or off the second switching element 14 via the first transistor 28 and the second transistor 29, which are connected in series. The first transistor 28 may be implemented by a P-channel (Pch) transistor, while the second transistor 29 may be implemented by an N-channel (Nch) transistor. When the first transistor 28 is turned on according to the control signal, the second switching element 14 is turned on. When the second transistor 29 is turned on according to the control signal, the second switching element 14 is turned off.

In one example operation, when the first switching element 11 is turned on and the second switching element 14 is turned on, the current Ion1 flows from the first switching element 11 through the second switching element 14 toward the ground. At this time, the depletion transistor 25 outputs the high level signal. As the current Ion1 continues to flow, the voltage across the second switching element 14 drops such that the voltage detected at the point a becomes positive while the voltage detected at the point b becomes negative. Accordingly, the depletion transistor 15 outputs the low level signal, and the second switching element 14 is turned off. When the second switching element 14 is turned off, the current Ion2 flows from the input terminal to the output terminal. Further, the first switching element 11 may be turned off synchronously with the second switching element 14.

Alternatively, the on or off state of the second switching element 14 may be controlled by the control signal output by the logic circuit 27. When the detection result output by the depletion transistor 25 indicates that the direction of the current Ion1 is about to reverse, i.e., the voltage across the second switching element 14 reaches 0 or the sign of the voltage is reversed, the logic circuit 27 outputs the control signal to turn on the first transistor 28 to turn off the second switching element 14. As a result, the current Ion2 flows.

In another example operation, when the first switching element 11 is turned off, electric power stored in the inductor 12 is discharged, and the current Ioff1 flows from the inductor 12 toward the capacitor 13. At this time, the second switching element 14 is turned off. As the current Ioff1 flows through the diode 17, the voltage detected at the point a becomes negative, while the voltage detected at the point b becomes positive. Accordingly, the depletion transistor 15 outputs the high level signal, and the second switching element 14 is turned on. When the second switching element 14 is turned on, the current Ioff2 flows from the capacitor 13 toward the inductor 12. Further, the first switching element 11 may be turned on synchronously with the second switching element 14.

Alternatively, the on or off state of the second switching element 14 may be controlled by the control signal output by the logic circuit 27. When the detection result output by the depletion transistor 25 indicates that the direction of the current Ioff1 is about to reverse, i.e., the voltage across the second switching element 14 reaches 0 or the sign of the voltage is reversed, the logic circuit 27 outputs the control signal to turn on the second transistor 29 to turn on the second switching element 14. As a result, the current Ioff2 flows.

When the first switching element 11 is turned on before or when the electric power stored in the inductor 12 is completely discharged, the operation described above for the example case in which the first switching element 11 is turned on and the second switching element 14 is turned on is repeated.

When the first switching element 11 is kept turned off even after the electric power stored in the inductor 12 is completely discharged, such as when the load is light, the current Ioff2 flows through the inductor 12 toward the ground. The voltage detected at the point a becomes positive, while the voltage detected at the point b becomes negative. Accordingly, the depletion transistor 25 outputs the low level signal, and the switching element 14 is turned off. At this time, a small amount of electric power may be stored in the inductor I2 such that a small amount of current Ioff3 may flow from the load toward the power supply. However, since the second switching element 14 is turned off instantaneously when the depletion transistor 25 detects that the reversing of the current direction, the amount of current Ioff3 is kept relatively small, thus increasing the circuit efficiency. Specifically, with the use of the depletion transistor 25, which is highly responsive, the electric power loss due to the current Ioff3 may be further suppressed.

Numerous additional modifications and variations are possible in light of the above teachings. It is therefore to be understood that within the scope of the appended claims, the disclosure of this patent specification may be practiced in ways other than those specifically described herein.

For example, the resistor 26 may be replaced by a fixed current supply circuit.

In another example, elements and/or features of different illustrative embodiments may be combined with each other and/or substituted for each other within the scope of this disclosure and appended claims.

Further, any one of the above-described and other example power supply circuits may be incorporated in any desired electronic device, such as a notebook computer, PDA device, portable phone, etc.

The invention claimed is:

1. An electric power supply circuit configured to connect to a power supply and to a load, comprising:
    a first switching element configured to turn on or off according to an external signal;
    an inductor capacitor circuit provided between the power supply and the load and configured to charge or discharge electric power provided by the power supply according to the on or off state of the first switching element;
    a rectifier diode provided between the first switching element and the ground;
    a second switching element provided in parallel with the rectifier diode and configured to turn on or off synchronously with the first switching element, said second switching element having a control line for receiving a control signal which controls said second switching element; and
    a depletion transistor configured to detect a direction of a current flowing through the inductor capacitor circuit based on a voltage detected across the second switching element, generate a detection result, and output said detection result to said control line of said second switching element.

2. The circuit of claim 1, wherein the depletion transistor is an N-channel depletion transistor.

3. The circuit of claim 2, further comprising:
    a resistor configured to connect with the N-channel depletion transistor.

4. The circuit of claim 1, further comprising:
    a logic circuit coupled to said control line of the second switching element and configured to output a control signal to said control line according to the detection result.

5. An electronic device, comprising:
    a power supply;
    a load;

an electric power supply circuit configured to connect to the power supply and the load, the electric power supply circuit comprising:
  a first switching element configured to turn on or off according to an external signal;
  an inductor capacitor circuit provided between the power supply and the load and configured to charge or discharge electric power provided by the power supply according to the on or off state of the first switching element;
  a rectifier diode provided between the first switching element and the ground;
  a second switching element provided in parallel with the rectifier diode and configured to turn on or off synchronously with the first switching element, said second switching element having a control line for receiving a control signal which controls said second switching element; and
  a depletion transistor configured to detect a direction of a current flowing through the inductor capacitor circuit based on a voltage detected across the second switching element, generate a detection result, and output said detection result to said control line of said second switching element.

6. The device of claim 5, wherein the depletion transistor of the electric power supply circuit is an N-channel depletion transistor.

7. The device of claim 6, wherein the electric power supply circuit further comprises a resistor configured to connect with the N-channel depletion transistor.

8. The device of claim 5, further comprising:
  a logic circuit coupled to said control line of the second switching element and configured to output a control signal to said control line according to the detection result.

9. The device of claim 5, wherein the electronic device is a portable device.

* * * * *